US009252941B2

(12) United States Patent
Volkovs

(10) Patent No.: US 9,252,941 B2
(45) Date of Patent: Feb. 2, 2016

(54) ENHANCED DIGITAL SIGNATURES ALGORITHM METHOD AND SYSTEM UTILITZING A SECRET GENERATOR

(76) Inventor: Nikolajs Volkovs, Toronto (CA)

(*) Notice: Subject to any disclaimer, the term of this patent is extended or adjusted under 35 U.S.C. 154(b) by 279 days.

(21) Appl. No.: 12/941,636

(22) Filed: Nov. 8, 2010

(65) Prior Publication Data

US 2011/0113253 A1    May 12, 2011

Related U.S. Application Data

(60) Provisional application No. 61/258,756, filed on Nov. 6, 2009.

(51) Int. Cl.
*H04L 29/06* (2006.01)
*H04L 9/00* (2006.01)
*H04L 9/30* (2006.01)
*H04L 9/32* (2006.01)

(52) U.S. Cl.
CPC .............. *H04L 9/002* (2013.01); *H04L 9/3013* (2013.01); *H04L 9/3247* (2013.01)

(58) Field of Classification Search
CPC ...... H04L 9/002; H04L 9/3013; H04L 9/3247
USPC .......................................................... 713/176
See application file for complete search history.

(56) References Cited

U.S. PATENT DOCUMENTS

| | | | | | |
|---|---|---|---|---|---|
| 5,818,939 | A * | 10/1998 | Davis | ...................... | G06F 21/72 380/28 |
| 6,487,660 | B1 * | 11/2002 | Vanstone | ............. | G06Q 20/341 380/229 |
| 7,869,591 | B1 * | 1/2011 | Nagel | ................... | H04L 9/0825 380/28 |
| 8,713,321 | B2 * | 4/2014 | Brown | .................. | H04L 9/3066 380/278 |
| 9,178,701 | B2 * | 11/2015 | Roth | ....................... | G06F 21/31 |
| 2001/0008013 | A1 * | 7/2001 | Johnson et al. | ............... | 713/170 |
| 2008/0095371 | A1 * | 4/2008 | Vataja | ................. | H04L 63/0428 380/278 |

* cited by examiner

*Primary Examiner* — Chau Le
(74) *Attorney, Agent, or Firm* — MU Patents; Timothy Marc Shropshire

(57) ABSTRACT

The present invention is a digital signatures scheme method and system that permits the generation of a digital signature in a manner whereby the generator is kept secret. The inclusion of a secret generator in the digital signatures scheme may reduce the potential for an attack upon the scheme to be successful. The present invention may incorporate a signing procedure and a verification procedure. The signing procedure may facilitate the determination of a group, and the identification of the generator from the group. The signing procedure may also keep the generator secret and may generate a digital signature of a message. The generator may be kept secret by one or more conditions, and one or more public keys may be utilized by the digital signatures scheme. The verification procedure may be a verification procedure operable to obtain the message and the digital signature and to verify the digital signature. Embodiments of the present invention may achieve processing of the signing procedure and/or verification procedure at a fast rate of speed, which may further diminish the chance of a successful attack upon the digital signatures scheme. Embodiments of the present invention may further generate variations of digital signatures.

14 Claims, 4 Drawing Sheets

ENHANCED DIGITAL SIGNATURES ALGORITHM METHOD AND SYSTEM UTILITZING A SECRET GENERATOR

This application claims the benefit of U.S. Provisional Patent Application Ser. No. 61/258,756 filed Nov. 6, 2009.

FIELD OF INVENTION

The present invention relates in general to the field of a digital signatures schemes.

BACKGROUND OF INVENTION

A digital signatures scheme is a method of authenticating digital information. The output of a digital signatures scheme is a binary string (or a pair of strings) that provides authenticity, integrity and non-repudiation of the transmitted message. A digital signatures scheme may be used to ensure that a message sent from a sender to a receiver is approved and authenticated, so that its content may be relied upon as not having been tampered with or having been generated by a source other than the sender.

Digital signatures algorithms (DSA) are based on public key cryptography (A. J. Menezes, P. C. van Oorschot, S. A. Vanstone, Handbook of Applied Cryptography. CRC Press, 1997) and consist of two parts: a signing algorithm and a verification algorithm.

Digital signatures algorithms, such as Lamport Signatures, Matyas-Meyer Signatures, RSA Signatures, ElGamal Signatures and others, are well-known and widely-used in practice (J. Pieprzyk, T. Hardjono, J. Sebbery, Fundamentals of Computer Security, Springer-Verlag, 2003).

NIST has published the Federal Information Processing Standard FIPS PUB 186, also known as the Digital Signature Standard (DSS). DSS uses SHA as the hashing algorithm together with a digital signatures algorithm (the "DSA"). DSA is based on the difficulty of computing the discrete logarithm problem as well as on the schemes presented by ELGamal and Shnorr (J. Pieprzyk, T. Hardjono, J. Sebbery, Fundamentals of Computer Security, Springer-Verlag, 2003).

Prior art digital signatures algorithms have been proven to be prone to attack. The potential that a digital signatures algorithm may be successfully attacked increases when an attacker is privy to the elements of the algorithm. In prior art digital signatures algorithms generally incorporate a public generator, as well as other public elements.

SUMMARY OF INVENTION

In one aspect the present invention is a system directed at a digital signatures scheme capable of averting attacks upon messages, comprising: at least one computer; a message sent by a sender by way of the at least one computer; the digital signatures scheme being operable by the at least one computer for application to the message, said digital signatures scheme being operable to keep a generator utilized by the digital signatures scheme secret; wherein attacks upon the security of the message are averted through the application of the digital signatures scheme.

In another aspect the present invention is a method of application of a digital signatures scheme to a message sent by a user from a computer, comprising the following steps: applying a signing procedure that identifies a generator and keeps the generator secret, said signing procedure appending a digital signature to the message; applying a verification procedure to the message with the digital signature appended thereto, said verification procedure further protecting the generator as secret; and averting an attack upon the security of the message.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawing wherein.

Figure 1:
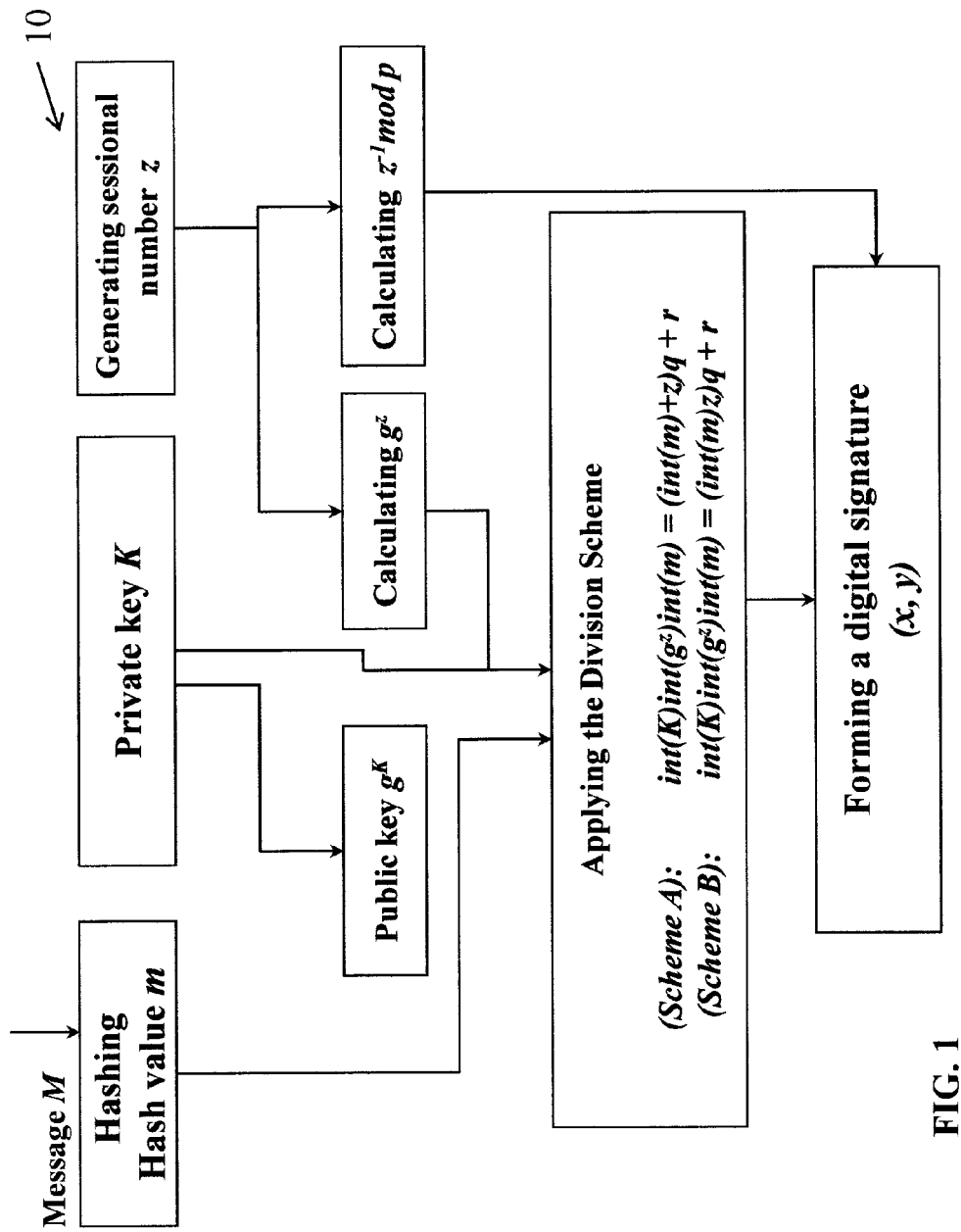
FIG. 1 is a flowchart of a signing procedure of an embodiment of the present invention.

In the drawing, one embodiment of the invention is illustrated by way of example. It is to be expressly understood that the description and drawings are only for the purpose of illustration and as an aid to understanding, and are not intended as a definition of the limits of the invention.

DETAILED DESCRIPTION

The present invention is a digital signatures scheme method and system that permits the generation of a digital signature in a manner whereby the generator secret is kept secret. The inclusion of a secret generator in the digital signatures scheme may reduce the potential for an attack upon said method and/or system to be successful. The present invention may utilize one or more public keys, such as, for example two public keys.

Embodiments of the present invention may process the signing procedure and/or verification procedure at a fast speed. A digital signatures scheme achieving a fast speed may provide benefits to the user in that it may further limit the time for a potential attack against a digital signature scheme to be undertaken. The limited time may diminish the chance for such an attack to be successful.

Embodiments of the present invention may also facilitate the generation of a wide range of variations of digital signatures. A specific digital signature may be generated in accordance with options chosen during the signing and/or verification procedures, as described herein. This feature of the present invention may permit a user to cause the present invention to generate a digital signature specific to that user's security needs, or other needs, such as, for example processing speed needs.

In other embodiments of the present invention, a private key may be kept secret. In order for the private key to be defined in a unique manner, the private key may be connected to a generator. The generator may also be kept secret. In embodiments of the present invention the generator may be kept secret in accordance with, or based upon, more than one conditions, such as, for example two conditions. Such embodiments may incorporate the generation of more than one public keys, such as, for example two public keys. The result may be a more secure digital signatures scheme in that the scheme may be less vulnerable to attack.

Figure 2:
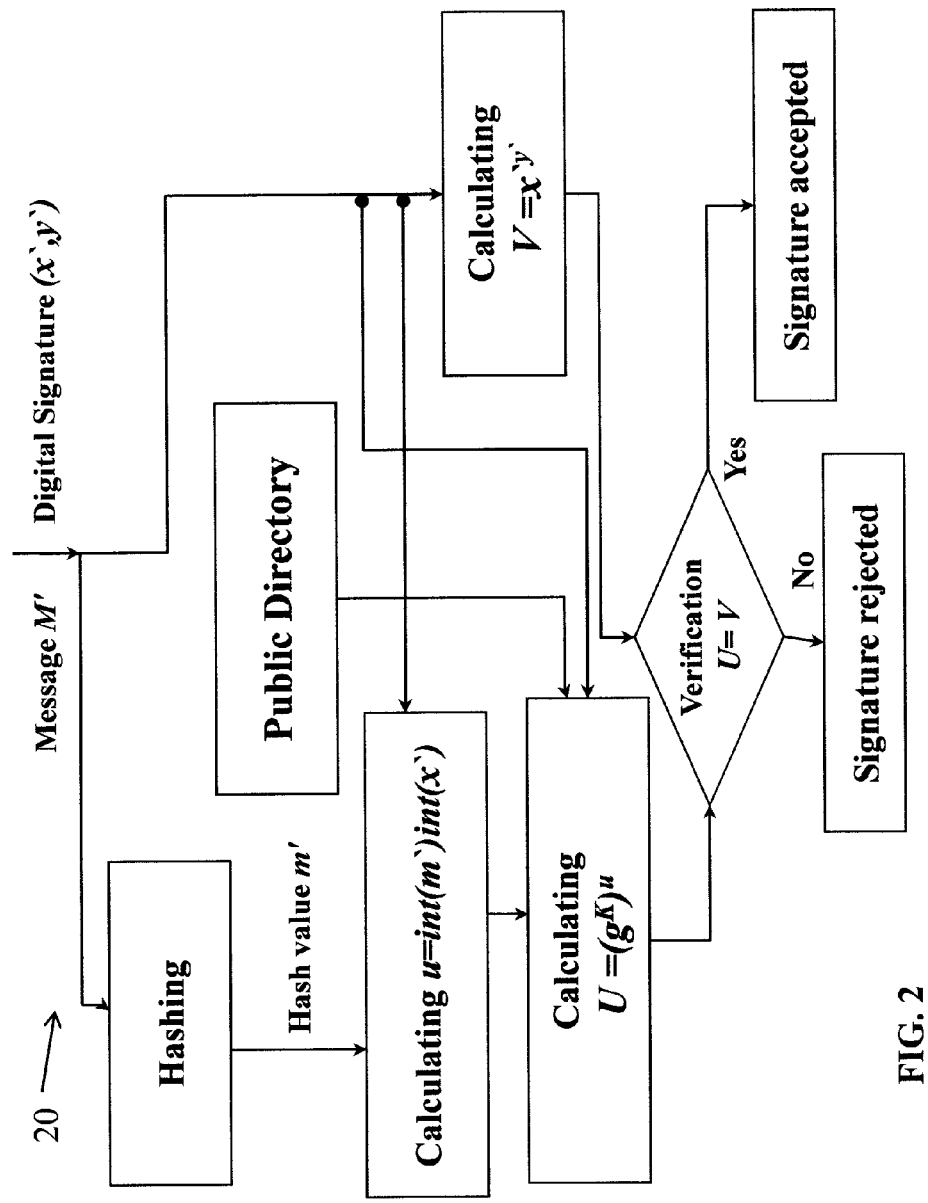
FIG. 2 is a flowchart of a verification procedure of the present invention.

In one embodiment of the present invention, the method and system may include a signing procedure 10, as shown in FIG. 1, and a verification procedure 20, as shown in FIG. 2. The signing procedure 10, as shown in FIG. 1 may facilitate the determination of a group, and the identification of the generator from the group. The signing procedure may also keep the generator secret. A public key, and a private key, may be generated in embodiments of the present invention. A sessional number may also be generated, in the framework of a signing procedure. The private key and sessional number may be kept secret.

After the signing procedure is completed a digital signature may be generated and appended to a message. At this point a verification procedure 20, as shown in FIG. 2, may be performed. The verification procedure may be applied to the message and digital signature obtained by a receiver. To perform the verification procedure the public key and the group may be known. The private key, generator and the sessional number may be unknown to the verification procedure, because these elements are kept secret. The result may be that an attacker may be less likely to be able to attack the signature.

Figure 3:
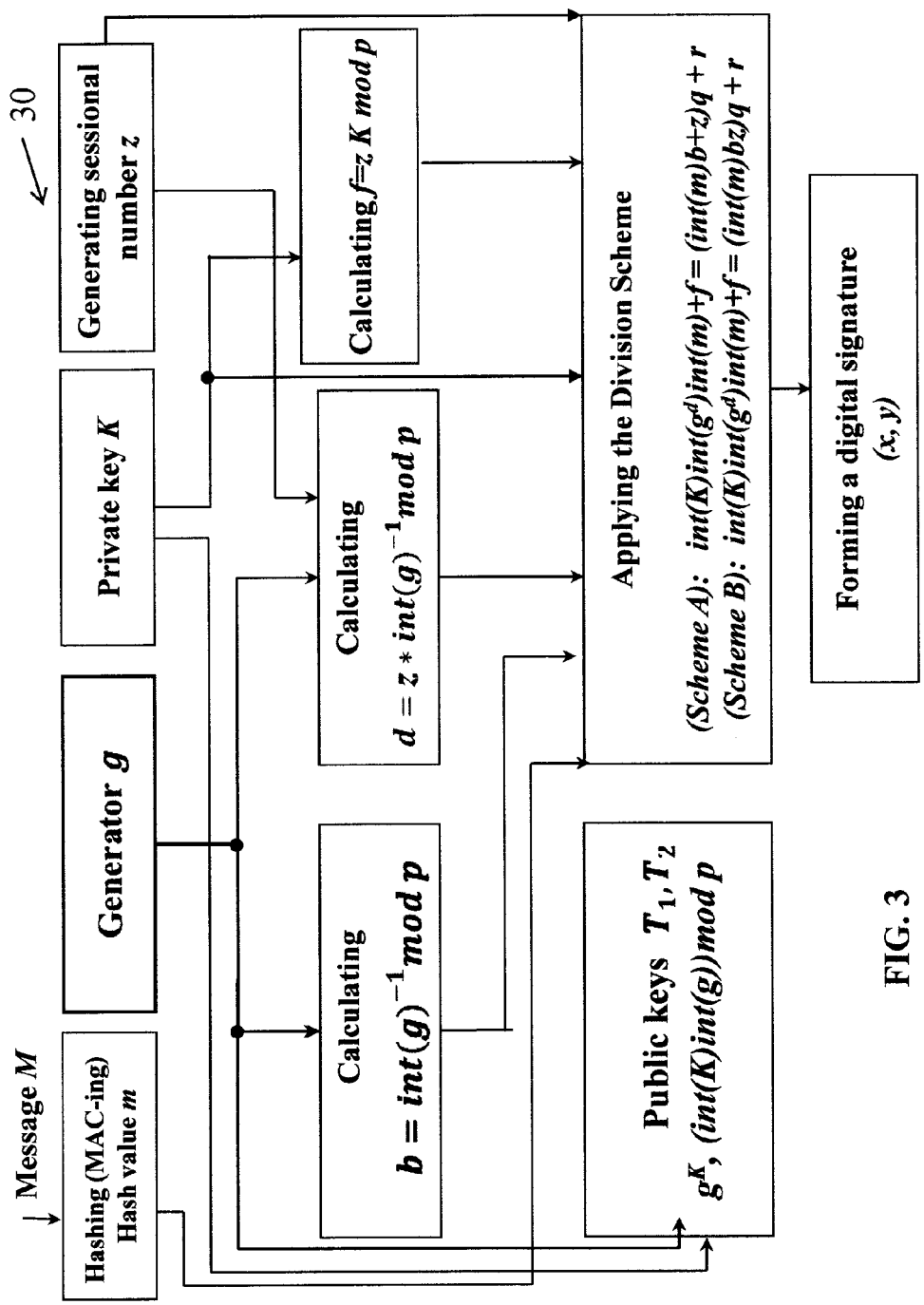
FIG. 3 is a flowchart of a signing procedure of an embodiment of the present invention generating two public keys.
Figure 4:
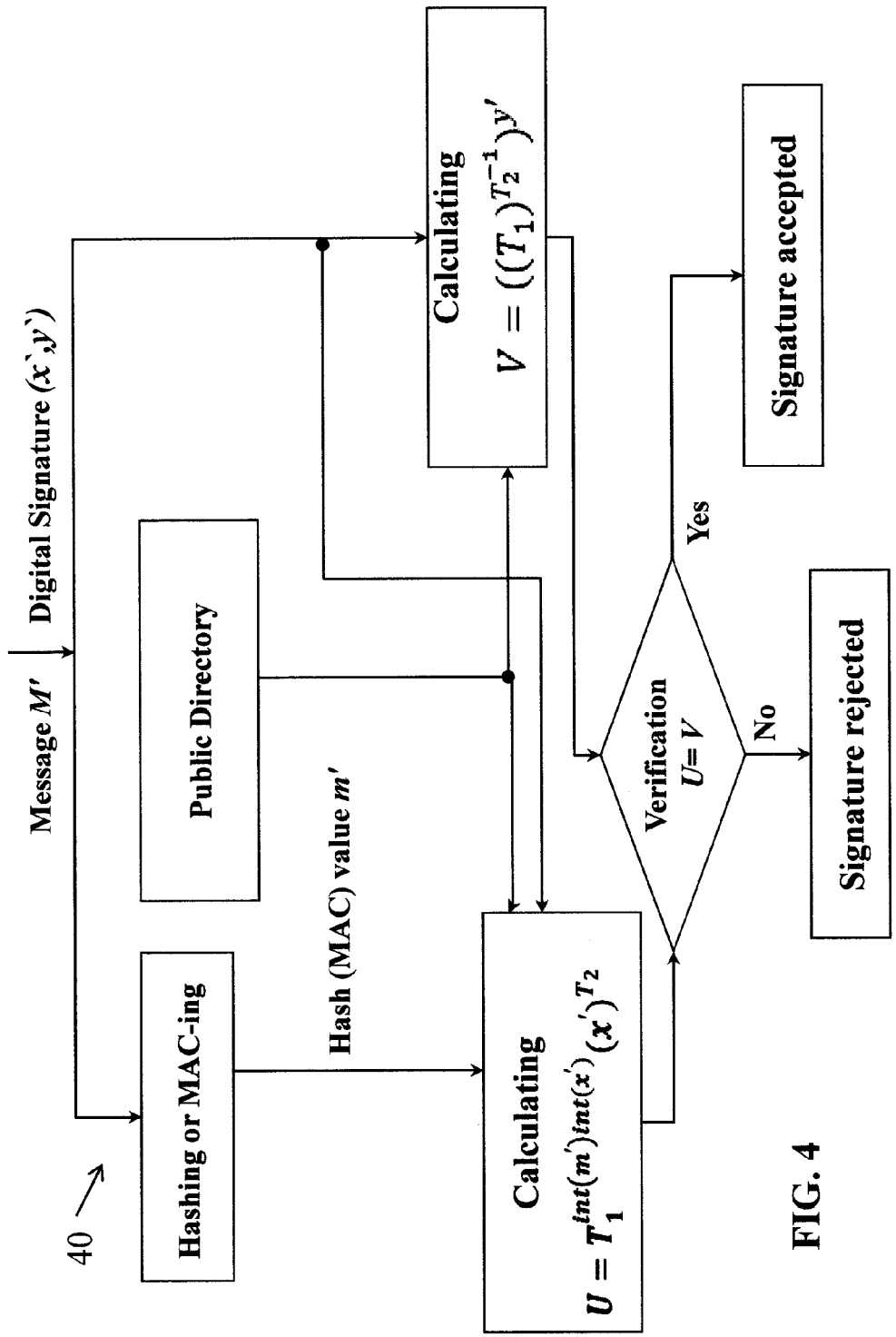
FIG. 4 is a flowchart of a verification procedure of an embodiment of the present invention generating two public keys.

In another embodiment of the present invention, the method and system may include a signing procedure 30, as shown in FIG. 3, and a verification procedure 40, as shown in FIG. 4. The signing procedure 30, as shown in FIG. 3 may facilitate the determination of a group, and the identification of the generator from the group. Two public keys based on a secret generator g and a private key K may be generated. A sessional number may also be generated, in the framework of a signing procedure. The secret generator g, private key K and the sessional number may be kept secret.

After the signing procedure is completed a digital signature may be generated and appended to a message. At this point a verification procedure 40, as shown in FIG. 4, may be performed. The verification procedure may be applied to the message and the digital signature obtained by a receiver. To perform the verification procedure two public keys and the group may be known. The secret generator g, a private key K and a sessional number may be unknown to the verification procedure because these elements are kept secret. The result may be that an attacker may be less likely to be able to attack the public keys of the scheme.

The present invention may offer several benefits over the known prior art. Digital signatures methods and systems facilitate the secure transfer of information. Attackers may attempt to find a means of diminishing the security of the transfer and thereby modifying information being transferred. The more elements of the digital signatures method and system that are known by an attacker may increase the likelihood of success of an attack. Known prior art digital signatures schemes utilize a group generator, which is stored in a public directory. By keeping the generator secret the present invention diminishes, and thereby limits, the number of elements of the digital signatures method and system that are known by, or available to, an attacker. This may also diminish the likelihood of success of an attack against the present invention because the class of possible attacks upon the digital signatures method and system may be reduced.

A further benefit of some embodiments of the present invention over the prior art may be the processing speed that may be achieved by the present invention. In accordance with the present invention the signing procedure and/or the verification procedure may be processed at a faster rate than the prior art is capable of achieving. Increased processing speed can cause the digital signatures method and system to function in a faster manner, which means a user does not have to wait overly long for secure transfer of information to occur and be verified. Moreover, increased processing speed can further reduce the chance that an attack against a digital signatures method or system may be successful. This in turn enhances the protection offered by the digital signatures method or system.

Yet another benefit of embodiments of the present invention over the prior art may be the flexibility of variations of digital signatures that may be generated by the present invention. Known prior art facilitates the generation of specific digital signatures and does not permit the user to generate variations of digital signatures. The present invention offers a user choices regarding the type of digital signature to be generated. These options may produce a benefit in that the user may tailor the type of digital signature generated to meet the needs of that user. For example, the digital signature may have increased security and therefore include multiple computations. As another example, a user may choose options that facilitate the generation of a digital signature that provides for fast processing. The variations of digital signatures that may be generated by some embodiments of the present invention may be virtually limitless and may represent a cloud or collection of digital signatures from which a user may choose. The benefit of offering this choice to a user is that the digital signature requirements and needs of a particular user may be met by the present invention because the user chooses the option that is best for him. Moreover, the scope of variations of digital signatures that may be generated by the present invention offer flexibility of use of the present invention with multiple technological environments, potentially including future technologies with which prior art may prove not to be compatible.

Other aspects and features of the present invention will become apparent to those ordinarily skilled in the art upon review of the following description of specific embodiments of the invention.

General Digital Signatures Method and System

To better exemplify the present invention it may be instructional to consider two digital signatures schemes generally. Known digital signatures schemes generally incorporate two algorithms: a signing algorithm and a verification algorithm. More particularly, the signing algorithm $$SG: \Gamma \cdot \Delta \rightarrow S$$

assigns a signature s to a pair d, m, where $d \in \Gamma$ is a secret key and $m \in \Delta$ is a message, that is, SG(d,m)=s; whereas the verification algorithm $$VER: \Gamma' \cdot \Delta \cdot S \rightarrow \{t, f\}$$

uses the public key $e \in \Gamma'$ of the signer and the message $m \in \Delta$ and checks whether the pair (e,m) matches the signature s. If there is a match, the algorithm returns t—TRUE. Otherwise, it generates—FALSE.

Using the ELGamal digital signature scheme (J. Pieprzyk, T. Hardjono, J. Sebbery, Fundamentals of Computer Security, Springer-Verlag, 2003), for example, a sender, Sally, considers a finite field GF(p), in which the discrete logarithm problem is difficult, and then selects a primitive element $g \in Z^*_p$ and a random integer $k \in Z^*_p$, which allows computing the public key $g^k$ mod p. Sally then sends $g^k$, g and p to the public registry. For a message $m \in GF(p)$, Sally selects a random integer $r \in Z^*_p$, such that gcd(r,p−1)=1, and calculates $x \equiv g^r$ mod p. She then solves the following congruence m≡k·x+r·y mod p by y. The signature is s=$SG_k$(m)=(x,y). Sally keeps secret k and r. A receiver, Bob, based on obtained message m̃ and s̃=(x̃,ỹ), calculates whether VER(m̃,s̃)=($g^{m̃}$=($g^k$)$^{x̃}$·x̃$^{ỹ}$ mod p).

Enhanced Digital Signatures Schemes A, B, C & D

Digital signatures schemes of the present invention are distinct from the known digital signatures schemes in that they incorporate a secret generator. Four digital signatures schemes described below, Scheme A, Scheme B, Scheme C and Scheme D incorporate methods and systems that function so as to keep the generator secret. These schemes represent improvements upon the prior art in that each may decrease the ability of an attacker to successfully attack the digital signatures method or system of the present invention.

Generally, the verification procedures of Scheme A, Scheme B, Scheme C and Scheme D verify that a message is true. This may involve verifying one or more values as relating to a digital signature appended or otherwise attached to a message. The digital signature may be generated and appended or otherwise attached to the message during the signing procedure. A skilled reader will recognize the wide variety of options and responses available that may be applied in an embodiment of the digital signature scheme of the present invention if the verification procedure produces a result indicating success, as well as the wide variety of options and responses available that may be applied if the verification procedure produces a result indicating an unsuccessful outcome of the verification procedure. For example, a result of the verification procedure indicating success is shown in FIGS. 2 and 4 as signature accepted, whereas an unsuccessful outcome of the verification procedure is shown in FIGS. 2 and 4 as signature rejected. A skilled reader will recognize that the means of indicating these outcomes and reacting to these outcomes may involve a variety of options and responses which may be have varying effects for the parties involved in sending and receiving a message, as well as for any perceived attackers.

The Schemes A-D further generally embodiments of the present invention that may generate variations of digital signatures. As discussed herein these options may offer particular benefits to users. Schemes C and D in particular offer a wide range of digital signature generation options to a user, as is discussed below.

Enhanced Digital Signatures Scheme (Scheme A)

Signing Procedure of Scheme A

A signing procedure of the present invention may include a cyclic group G of prime order p, where p is of size $2^\alpha$. It may be possible that a generator g of G may be chosen. A sender, then, may choose a private key K, of k bits and the public key $g^{int(K)}$ may be computed.

The public key, the information about the cyclic group, as such information may be required for a receiver to perform the verification operations in the group, may be stored to a public directory. A private key K and a generator g are kept secret.

A hash value of a given message M may be m. In another embodiment of the present invention a MAC value of a given message M may be m. It may be assumed that m has h bits where $$h < k \quad (1)$$

and $$max(h, k-h) < \alpha. \quad (2)$$

It may be possible to generate a random sessional number 1<z<p, which is kept secret. The number of bits of z may be at most h. A sender may compute, further $$g^z$$

and $$z^{-1} \bmod p.$$

Then, using the division scheme, the sender may calculate a unique pair of integers q and r such that $$int(K)int(g^z)int(m) = (int(m) + z)q + r. \quad (3)$$

The calculated values q and r may be kept secret. Integers int(K), int($g^z$) and int(m) may be applied, the binary presentation of which may be the sequences of bits K, $g^z$ and m, correspondingly.

Then the pair (x,y) for $$x = (g^z) \text{ and } y = (int(m)qb + q + br) \bmod p, \quad (4)$$

where $$b \equiv (z)^{-1} \bmod p \quad (5)$$

may be a digital signature of m.

If, by coincidence, either q, r or int(m)qb+q+br is 0, or $g^z$ is equal 1, where 1 is an identity of group G, it may be necessary to generate another 1<z<p, and to recalculate q, r in accordance with (3), and compute $g^z$ again. If, by coincidence, int($g^z$)=p or int($g^z$)=1 it may be necessary to choose another z and repeat the corresponding computations.

Verification Procedure of Scheme A

In one embodiment of the present invention a verification procedure of the present scheme may involve a receiver obtaining a message M' and a digital signature (x',y'). A receiver may know the public key $g^{int(K)}$, and the group G. A receiver may not know a private key K, a generator g and a sessional number z, as the values are kept secret. A receiver may not know q and r either.

The message M' may be hashed to m'. In another embodiment the message M' may be MAC-ed with the corresponding key to m'.

The following two expressions may be calculated $$((g^{int(K)})^{int(x')})^{int(m')}, (x')^{y'}. \quad (6)$$

If the prior two expressions are equal, then the signature may be valid, otherwise the signature may be rejected.

In another embodiment of the present invention the verification procedure may be presented in another way which may be equivalent. Indeed, after obtaining a digital signature (x', y') and after hashing (or MAC-ing) message M' to m' a receiver may be the integer $$u = int(x')int(m') \bmod p.$$

Then a receiver may verify if two values $$(g^{int(K)})^u$$

and $$(x')^{y'}$$

are equal. If the prior two expressions are equal, then the signature may be valid, otherwise the signature may be rejected.

It may be possible to show that the presented digital signatures scheme and the verification procedure are correct through the theorem that follows.

Theorem for Scheme A

Parameters q and r may be calculated by the division scheme in accordance with (3) and m may be a hash (or MAC) value of a message M. Further K and $g^{int(K)}$ may be a private and a public key, correspondingly, G may be a group of prime order p. Then $1<z<p$ may be a secret sessional number. It may be assumed that the described above conditions (1) and (2) are satisfied.

Then the pair (x,y) for $$x=(g^z) \text{ and } y=(int(m)bq+q+br) \bmod p,$$

where $$b \equiv (z)^{-1} \bmod p$$

may be a digital signature of m with the following verification procedure $$(g^{int(K)})^{(int(x)int(m))}=(x)^y. \quad (7)$$

Proof for Scheme A

Proof of an embodiment of the present invention, such as that of Scheme A, may begin by determining $$int(K)int(g^z)int(m)=(int(m)+z)q+r,$$

which may get $$(g^{int(K)})^{(int(x)int(m))}=g^{(int(m)q+zq+r)}. \quad (8)$$

It may be possible to determine from condition (1) and from z having a maximum size of h bits, that it may follow that $$int(m)=int(m) \bmod p$$

and $$z=z \bmod p.$$

Alternatively, $$(x)^y = (g^z)^{(int(m)bq+q+br)} = g^{(zbq(int(m)+zq+(zbr))}$$
$$= g^{(int(m)q+zq+r)} = (g^{int(K)})^{(int(x)int(m))}.$$

To exemplify an embodiment of the present invention a "toy" example of the scheme of Scheme A may be considered.

In this example of Scheme A, it may be possible to incorporate $GF^*(2^5)$, that is p=31. In this embodiment, K=41, m=9, z=20. It may be possible to choose the generator $g=x^2+1$ and assume that $GF(2^5)$ was generated modulo $x^5+x^2+1$.

The public key may be computed as follows:

$$g^K=g^{41}=g^{10}.$$

Next it may be necessary to calculate $g^z$ and $z^{-1} \bmod 31$. The result may be $$g^z=g^{20}=x^3+x^2, int(g^z)=int(x^3+x^2)=12.$$

$$b=z^{-1} \bmod 31 = 20^{-1} \bmod 31 = 14.$$

It may be necessary to form a signature for m. According to the scheme presented above it may be possible to find q, r such that $$int(K)int(g^z)int(m)=(int(m)+z)q+r.$$

It may be possible to get $$41*12*9=(9+20)q+r,$$

that is, q=152, r=20.

Eventually $(int(m)bq+q+br) \bmod p$ may be computed for $b \equiv (z)^{-1} \bmod p$. It may be possible to obtain $$(int(m)bq+q+br) \bmod p = (9*14*152+152+14*20) \bmod 31 = 23.$$

So the signature of m=9 is $$(x^3+x^2, 23)$$

A verification procedure may be applied whereby it may be assumed that along with a message M a signature $(x^3+x^2, 23)$ may be received. Following hashing M it may be possible to achieve the result m=9.

It may be possible to compute $$(g^K)^{(int(x)*int(m))}=(g^{10})^{108}=g^{26}.$$

Alternatively, it may be possible to compute $$(x)^y=g^{(20*23)}=g^{460}=g^{26}.$$

Thus, the digital signature $$(x^3+x^2, 23)$$

of m=9 may be accepted.

We note that according to the scheme, a receiver may not know a generator, that is, a receiver may not know that $(g^K)=g^{10}$ and $g^z=g^{14}$. Such facts are utilized in the "toy" example for the purpose of simplifying the computations.

In the case when int(m)=0 it may not be possible to apply the scheme. However the problem can be overcome. For example, it may be possible to chose any integer a>0 and always when int(m)=0 it may be possible to set int(m)=a. The integer a>0 may be stored to a public directory.

Enhanced Digital Signatures Scheme (Scheme B)

Signing Procedure of Scheme B

In another embodiment of the present invention, a signing procedure scheme may include a cyclic group G of prime order p, where p is of size $2^\alpha$. It may be possible that a generator g of G may be chosen. A sender, then, may choose a private key K, of k bits and compute the public key $g^{int(K)}$.

The public key, the information about the cyclic group may be stored to a public directory. Such information may be required for a receiver to perform the verification operations in the group. A private key K and a generator g may be kept secret.

A hash value of a given message M may be m. In another embodiment of the present invention a MAC value of a given message M may be m. It may be assumed that m has h bits where $$h<k \quad (1')$$

and $$\max(h, k-h) < \alpha. \quad (2')$$

Again, it may be possible to generate a random sessional number $1<z<p$, which is kept secret. The number of bits of z may be at most h. A sender may compute, further $$g^z$$

and $$z^{-1} \bmod p.$$

Then, using the division scheme, the sender may calculate a unique pair of integers q and r such that $$int(K)int(g^z)int(m)=(int(m)z)q+r. \quad (3')$$

The calculated values q and r may be kept secret. Integers int(K), int($g^z$) and int(m) may be applied, the binary presentation of which may be the sequences of bits K, $g^z$ and m, correspondingly.

Then the pair (x,y) for $$x=(g^z) \text{ and } y=(\text{int}(m)q+br) \bmod p, \quad (4')$$

where $$b \equiv (z)^{-1} \bmod p \quad (5')$$

may be a digital signature of m.

If, by coincidence, either q, r or y is 0, or $g^z$ is equal to 1, where 1 is an identity of group G, it may be necessary to generate another 1<z<p, and to recalculate q, r in accordance with (3'), and compute again $g^z$. If, by coincidence, int($g^z$)=p or int($g^z$)=1 it may also be necessary to choose another z and repeat the corresponding computations.

Verification Procedure for Scheme B

A verification procedure of the scheme B of the present invention may be virtually the same verification procedure as applied in the case of scheme A, as discussed previously. A receiver may obtain a message M' and a digital signature (x',y'). A receiver may know the public key $g^{int(K)}$, and the group G. A receiver may not know a private key K, a generator g and a sessional number z, as the values may be kept secret. A receiver may not know q and r either.

The message M' may be hashed to m'. In another embodiment the message M' may be MAC-ed with the corresponding key to m'.

The following two expressions may be calculated $$((g^{int(K)})^{int(x')})^{int(m')}, (x')^{y'}. \quad (6)$$

If the prior two expressions at (6) are equal, then the signature may be valid, otherwise the signature may be rejected.

In another embodiment of the present invention, the verification procedure may be presented in another equivalent way. Indeed, after obtaining a digital signature (x',y') and after hashing (or MAC-ing) message M' to m' a receiver may achieve the result of the integer $$u=\text{int}(x')\text{int}(m') \bmod p.$$

Then a receiver may verify if two values $$(g^{int(K)})^u$$

and $$(x')^{y'}$$

are equal. If the two expressions $(g^{int(K)})^u$ and $(x')^{y'}$ are equal, then the signature may be valid, otherwise the signature may be rejected.

It may be possible to show that the presented digital signatures scheme and the verification procedure are correct through the theorem that follows.

Theorem for Scheme B

Parameters q and r may be calculated by the division scheme in accordance with (3') and m may be a hash (or MAC) value of a message M. Further K and $g^{int(K)}$ may be a private and a public key, correspondingly, G may be a group of prime order p. Then 1<z<p may be a secret sessional number. It may be assumed that the conditions (1') and (2') as described above are satisfied.

Then the pair (x,y) for $$x=(g^z) \text{ and } y=(\text{int}(m)q+br) \bmod p,$$

where $$b \equiv (z)^{-1} \bmod p$$

may be a digital signature of m with the following verification procedure $$(g^{int(K)})^{(int(x)int(m))}=(x)^y. \quad (7')$$

Proof of Scheme B

Proof of an embodiment of the present invention, such as that of Scheme B, may begin by determining $$\text{int}(K)\text{int}(g^z)\text{int}(m)=(\text{int}(m)z)q+r;$$

which may get $$(g^{int(K)})^{(int(x)int(m))}=g^{(int(m)zq+r)}. \quad (8')$$

It may be possible to determine from condition (1') and from z having a maximum size of h bits that it follows that $$\text{int}(m)=\text{int}(m) \bmod p$$

and $$z=z \bmod p.$$

Alternatively, $$(x)^y = (g^z)^{(int(m)q+br)} = g^{(z(int(m)q+(zbr))}$$
$$= g^{(int(m)zq+r)} = (g^{int(K)})^{(int(x)int(m))}.$$

To exemplify an embodiment of the present invention a "toy" example of the scheme of Scheme B may be considered It may be assumed that the present invention may work in $GF^*(2^5)$, that is p=31. Further it may be that K=41, m=9, z=14. It may be assumed a generator $g=x^2+1$ is chosen and that $GF(2^5)$ was generated modulo $x^5+x^2+1$.

The public key may be computed $$g^K=g^{41}=g^{10}.$$

It may be possible to calculate $g^z$ and $z^{-1}$ mod 31. The result may be $$g^z=g^{14}=x^4+x^3+x^2+1, \text{int}(g^z)=\text{int}(x^4+x^3+x^2+1)=29,$$

$$z^{-1} \bmod 31 = 20^{-1} \bmod 31 = 20.$$

Now it may be possible to form a signature for m. According to the scheme presented above it may be possible to find q, r such that $$\text{int}(K)\text{int}(g^z)\text{int}(m)=(\text{int}(m)z)q+r.$$

It may be possible to get $$41*29*9=(9*14)q+r;$$

that is, q=84, r=117.

Eventually it may be possible to compute (int(m)q+br)mod p, where $b \equiv (z)^{-1}$ mod p. It may be possible to obtain $$(\text{int}(m)q+br) \bmod p = (9*84+20*117) \bmod 31 = 27.$$

So the signature of m=9 is $$(x^4+x^3+x^2+1, 27).$$

Consider the verification procedure. Assume that along with a message M it is possible to receive a signature ($x^4+x^3+x^2+1$, 27) and after hashing (or MAC-ing) M the result may be m=9.

It may be possible to compute $$((g^K)^{(int(x)int(m))}) = (g^{10})^{(29*9)} = g^{2610} = g^6.$$

Alternatively, it may be possible to compute $$(x)^y = g^{(14*27)} = g^6.$$

Thus, the signature $$(x^4+x^3+x^2+1, 27)$$

of m=9 may be accepted.

We note that according to the scheme, a receiver may not know a generator, that is, a receiver may not know that $g^K = g^{10}$ and $g^z = g^{14}$. Such facts are utilized in the "toy" example for the purpose of simplifying the computations.

Schemes A & B Generally

In one embodiment of the present invention, expressions (3) and (3') may be applied to incorporate a general construction instead of int(m). For example, it may be possible to consider expressions $$int(K)int(g^z)(-int(m)) = (int(m)+z)q+r \quad (9)$$

and $$int(K)int(g^z)(-int(m)) = (int(m)z)q+r, \quad (9')$$

where (-int(m)) is a number such that $$int(m)+(-int(m)) \equiv 0 \bmod p.$$

It may be possible to consider the situation when $$int(K)int(g^z)(int(m)))^n = (int(m)+z)q+r \quad (10)$$

and $$int(K)int(g^z)(int(m))^n = (int(m)z)q+r \quad (10')$$

for n>1.

In general, any mapping f: Z→Z may be used in the corresponding expressions and in this case the result may be $$int(K)int(g^z)f(int(m)) = (int(m)+z)q+r \quad (11)$$

and $$int(K)int(g^z)f(int(m)) = (int(m)z)q+r. \quad (11')$$

Thus in expressions (3) and (3') it may be possible to apply an identity mapping f(x)=x for all x∈Z.

In this embodiment the verification procedure for the cases (11) and (11') may have form $$(g^{int(K)})^{(int(x)f(int(m)))} = (x)^y.$$

If the present invention utilizes an identity mapping, this produces a simple and natural result, as it does not require any additional computation f(int(m)) for both signing and verification schemes.

Enhanced Digital Signatures Schemes C & D

Digital Signatures Scheme C and Scheme D represent examples of embodiments of the present invention that incorporate methods and systems that function so as to keep the generator and a key secret and that further generate two public keys.

Enhanced Digital Signatures Scheme (Scheme C)

Signing Procedure of Scheme C

A signing procedure of an embodiment of the present invention represented by Scheme C may include a cyclic group G of prime order of size $2^\alpha$. Such a cyclic group may further be such that the discrete logarithm problem is a hard problem for the cyclic group. In this embodiment of the present invention a generator g of G may be chosen. A sender, then, may choose a private key K, of k bits. The two public keys as follow represented by (1") and (2") may be also be chosen, generated and/or otherwise computed $$g^{int(K)} \quad (1'')$$

and $$(int(K)*int(g)) \bmod p \quad (2'')$$

It is possible that for any bit string y the present invention may denote by int(y) the integer whose binary presentation is y.

In this embodiment of the present invention it may be possible to assume that K is k bits long, $g^{int(K)}$ is not 1∈G and (int(K)*int(g))mod p is not equal either 0, 1 or p−1.

It may also be possible to denote by $T_1$ and $T_2$ $g^{int(K)}$ and (int(K)*int(g))mod p, correspondingly.

The public keys $T_1$ and $T_2$, and the information about the cyclic group may be stored to a public directory. The public keys and/or the information about the cyclic group may be required for a receiver to perform the verification operations in the group. A private key K and a generator g may be kept secret.

In embodiment of the present invention corresponding to Scheme C, $T_1$ may be an element of group G, while $T_2$ may be an integer such that $$1 < T_2 < p-1.$$

In this embodiment of the present invention it may be possible to generate a random sessional number 1<z<p−1, which may be kept secret. The number of bits of z may be at most h. A sender may compute, further $$d = z*int(g)^{-1} \bmod p. \quad (3'')$$

and may check if the following conditions (4") and (5") are satisfied as follows $$d \neq int(K) \bmod p \quad (4'')$$

and $$1 < d < p-1 \quad (5'')$$

In the event that z does not satisfy conditions (4") and (5"), it may be necessary to generate another z and recalculate 3.

The present invention may compute the following values $$b = int(g)^{-1} \bmod p, \quad (6'')$$

$$f = z*int(K) \bmod p, \quad (8'')$$

and $$g^d \quad (9'')$$

A hash value of a given message M may be m. In another embodiment of the present invention a MAC value of a given message M may be m. It may be assumed that m has h bits where $$h < k$$

and $$\max(h, k-h) < \alpha. \quad (10'')$$

At this point, using the division scheme, the sender may calculate a unique pair of integers q and r such that $$int(K)int(m)g^d + f = (int(m)b+z)q+r. \quad (11'')$$

and $$0 \leq r < int(m)b+z.$$

The present invention may further obtain the values as follow (x,y), where $x = g^d$ and $y = (\text{int}(m)q + \text{int}(g)zq + \text{int}(g)r) \bmod p,$ may be a digital signature of m.

If, by coincidence, $\text{int}(g^d) = p-1$, or $(yT_2^{-1}) \bmod p$ is equal to either 0, or $p-1$, it may be necessary to generate another $1 < z < p-1$, and to repeat all the computations starting from (3"). The conditions related to $g^d$ may be referred to as x-condition, while the condition related to y may be referred to as y-condition.

In some embodiments of the present invention it may not be necessary to compute b for every message M. Instead b may be computed just once and the computed value may be used every time when a signature is generated.

Verification Procedure of Scheme C

A verification procedure of the present invention that is represented by Scheme C may involve a receiver obtaining a message M' and a digital signature (x',y'). A receiver may know the public keys $T_1$ and $T_2$, and the group G. A receiver may not know a private key K, a generator g and a sessional number z, as the values may be kept secret. A receiver may not know q and r either.

In one embodiment of the present invention the message M' may be hashed to m'. In another embodiment of the present invention the message M' may be MAC-ed with the corresponding key to m'.

The following two expressions may be calculated by the present invention $T_1^{\text{int}(m')\text{int}(x')}(x')^{T_2}, ((T_1)^{T_2^{-1}})^{y'}.$ If the prior two expressions are equal, then the signature may be valid, otherwise the signature may be rejected.

It may be possible to show that the presented digital signatures scheme and the verification procedure are correct for an embodiment of the present invention in accordance with Scheme C through the theorem that follows.

Theorem for Scheme C

Parameters q and r may be calculated by the division scheme in accordance with (11") and m may be a hash (or MAC) value of a message M. Further $T_1$ and $T_2$ may be two public keys, G may be a group of prime order p, g may be a generator of G and K may be a private key. In this embodiment of the present invention $1 < z < p-1$ may be a secret sessional number. It may be possible to assume that the conditions (4") and (5") described above, as well as x-condition and y-condition are satisfied.

In this embodiment of the present invention the pair (x,y), for $x = g^d$ and $y = (\text{int}(m)q + \text{int}(g)zq + \text{int}(g)r) \bmod p,$ may be a digital signature of m. The following verification procedure may be applied $T_1^{(\text{int}(m)\text{int}(x))} x^{T_2} = ((T_1)^{T_2^{-1}})^y.$ Proof for Scheme C Proof of an embodiment of the present invention represented by Scheme C may begin by determining $\text{int}(K)\text{int}(m)\text{int}(g^d) + f = (\text{int}(m)b + z)q + r,$ which may produce $g^{\text{int}(K)(\text{int}(m)\text{int}(g^d))} g^f = T_1^{(\text{int}(m)\text{int}(g^d))} g^{(\text{int}(K)z)} = g^{(\text{int}(m)bq + zq + r)}$ and $T_1^{(\text{int}(m)\text{int}(g^d))} x^{T_2} = T_1^{(\text{int}(m)\text{int}(g^d))} g^{(z * \text{int}(g)^{-1})(\text{int}(g)\text{int}(K))} = T_1^{(\text{int}(m)\text{int}(g^d))} g^{(\text{int}(K)z)}.$ Alternatively it is possible that $\left((T_1)^{T_2^{-1}}\right)^y = g^{\text{int}(g)^{-1}(\text{int}(m)q + \text{int}(g)zq_{\text{int}(g)}r)} =$ $= g^{(\text{int}(m)\text{int}(g)^{-1}q + \text{int}(g)^{-1}\text{int}(g)zq + \text{int}(g)^{-1}\text{int}(g)r)} =$ $= g^{(\text{int}(m)\text{int}(g)^{-1}q + zq + r)}$ To exemplify the present invention a "toy" example of the embodiment of the present invention relating to Scheme C may be applied.

It may be possible to work in $GF^*(2^5)$, that is $p = 31$.

It may be possible to choose the generator $g = x^2 + 1$ and assume that $GF(2^5)$ was generated modulo $x^5 + x^2 + 1$.

Further it may be possible that $K = 41$, $m = 9$, $z = 17$.

The public keys $T_1$ and $T_2$ may be computed $T_1 = g^K = g^{41} = g^{10}$ and $T_2 = \text{int}(g)\text{int}(K) \bmod 31 = 19.$ Next it may be possible to calculate $b = \text{int}(g)^{-1} \bmod p = 5^{-1} \bmod 31 = 25$ and $d = \text{int}(g)^{-1} z \bmod 31 = 25 * 17 \bmod 31 = 22.$ It may further be possible to calculate $g^d$ and $\text{int}(g^d)$. The results of these foregoing steps may be $g^d = g^{22} = x^4 + x + 1$ and $\text{int}(g^d) = 19.$ It is possible that these steps will show that conditions (4") and (5") are met as well as the following $22 \neq 41 \bmod 31.$ Next it may be possible to derive q and r such that $\text{int}(K)\text{int}(m)g^d + f = (\text{int}(m)b + z)q + r,$ and $0 \leq r < \text{int}(m)b + z$ for $f = \text{int}(K)z \bmod 31 = 17 * 41 \bmod 31 = 15$ and to start forming a digital signature for m.

It may be possible to derive $$41*9*19+15=(9*25+17)q+r,$$

that is $$7026=242q+r,$$

so that q=29, r=8 and $$y=(\text{int}(m)q+\text{int}(g)qz+\text{int}(g)r)\bmod p=(9*29+5*29*17+5*8)\bmod 31=7.$$

$$y=(\text{int}(m)q+\text{int}(g)zq+\text{int}(g)r)\bmod p,$$

It may also be possible to note that both x-condition and y-condition are satisfied.

The result may be that the signature of m is a pair $$(g^d,(\text{int}(m)q+\text{int}(g)qz+\text{int}(g)r)\bmod p),$$

that is, $$(x^4+x+1,7).$$

In an embodiment of the present invention it may be possible in light of the verification procedure to assume that along with a message M a signature (x,y) may be received in a form of pair ($x^4+x+1$, 7). After hashing (or MAC-ing) M it may be possible to obtain m=9.

It may further be possible to compute $$T_1^{(\text{int}(m)\text{int}(x))}x^{T_2}=((g^{10})^{171})(g^{22})^{19}=g^{20}.$$

or alternatively, $$((T_1)^{T_2^{-1}})^y=g^{(25*7)}=g^{20}.$$

It may then be possible to accept the digital signature $$(x^4+x+1,7)$$

of m=9.

In an embodiment of the present invention relating to Scheme C it is possible that a receiver may not know a generator $x^2+1$ and therefore a receiver may not know that $T_1$ is $g^{10}$ and that $g^d$, that is, x is $g^{22}$. Such facts may be utilized in the "toy" example for the purpose of simplifying the computations.

For example, in the case when int(m)=0 it may not be possible to apply a prior art digital signatures scheme. However the problem can be overcome by the present invention. For example, it may be possible to chose any integer a>0 and always when int(m)=0 it may be possible to set int(m)=a. The integer a>0 may be stored to a public directory.

Enhanced Digital Signatures Scheme (Scheme D)

Signing Procedure of Scheme D

A signing procedure of the present invention relating to Scheme D may include again a cyclic group G of prime order of size $2^\alpha$. The discrete logarithm problem may be a hard problem for such a cyclic group. In this embodiment of the present invention may be possible that a generator g of G may be chosen. A sender may choose a private key K, of k bits and the two public keys as follow which may be chosen, generated or otherwise computed $$g^{\text{int}(K)} \tag{1*}$$

and $$(\text{int}(K)*\text{int}(g))\bmod p \tag{2*}$$

In this embodiment of the present invention it may be possible to assume that K is k bits long, $g^{\text{int}(K)}$ is not 1∈G and (int(K)*int(g))mod p is not equal either 0, 1 or p−1.

It may also be possible to denote by $T_1$ and $T_2$ $g^{\text{int}(K)}$ and (int(K)*int(g))mod p, correspondingly.

In this embodiment of the present invention, the public keys $T_1$ and $T_2$, the information about the cyclic group may be stored to a public directory. In embodiments of the present invention the public keys and/or the information about the cyclic group may be required for a receiver to perform the verification operations in the group. A private key K and a generator g may be kept secret.

In embodiments of the present invention relating to Scheme D $T_1$ may be an element of group G, while $T_2$ may be an integer such that $$1<T_2<p-1.$$

It may be possible to generate a random sessional number $1<z<p-1$, which may be kept secret. The number of bits of z may be at most h. A sender may compute $$d=z*\text{int}(g)^{-1}\bmod p. \tag{3*}$$

and may check if the conditions (4*) and (5*) as follow are satisfied $$d\neq\text{int}(K)\bmod p \tag{4*}$$

and $$1<d<p-1 \tag{5*}$$

In an embodiment of the present invention in which z does not satisfy conditions (4*) and (5*), it may be necessary to generate another z and recalculate 3.

In an embodiment of the present invention relating to Scheme D following values may be computed or otherwise generated $$b=\text{int}(g)^{-1}\bmod p, \tag{6*}$$

$$f=z*\text{int}(K)\bmod p, \tag{8*}$$

and $$g^d \tag{9*}$$

In one embodiment of the present invention a hash value of a given message M may be m. In another embodiment of the present invention a MAC value of a given message M may be m. It is possible to assume in embodiments of the present invention that m has h bits where $$h<k$$

and $$\max(h,k-h)<\alpha. \tag{10*}$$

In such an embodiment of the present invention it may possible that by using the division scheme the sender may calculate a unique pair of integers q and r such that $$\text{int}(K)\text{int}(m)g^d+f=(\text{int}(m)bz)q+r. \tag{11*}$$

and $$0\leq r<\text{int}(m)bz.$$

In such an embodiment of the present invention the pair (x,y), where $$x=g^d$$

and $$y=(\text{int}(m)qz+\text{int}(g)r)\bmod p,$$

may be a digital signature of m.

If, by coincidence, $\text{int}(g^d)=p-1$, or $(yT_2^{-1}) \bmod p$ is equal either 0, or $p-1$, it may be necessary to generate another $1<z<p-1$, and to repeat all the computations starting from (3*). The conditions related to $g^d$ may be referred to as x-condition, while the condition related to y may be referred to as y-condition.

In some embodiments of the present invention relating to Scheme D it may not e necessary to compute b for every message M. Such a computation may be undertaken just once and the computed value may be used every time when a signature is generated.

Verification procedure of Scheme D

A verification procedure of the present scheme may involve a receiver obtaining a message M' and a digital signature (x',y'). In an embodiment of the present invention relating to Scheme D a receiver may know the public keys $T_1$ and $T_2$, and the group G. It is possible that a receiver may not know a private key K, a generator g and a sessional number z, as the values are kept secret. It is further possible that a receiver may not know q and r either.

In one embodiment of the present invention the message M' may be hashed to m'. In another embodiment of the present invention the message M' may be MAC-ed with the corresponding key to m'.

In embodiments of the present invention relating to Scheme D the following two expressions may be calculated $$T_1^{int(m')int(x')}(x')^{T_2}, ((T_1)^{T_2-1})^{y'}.$$

If the prior two expressions are equal, then the signature may be valid, otherwise the signature may be rejected.

It may be possible to show easily that the presented digital signature scheme and the verification procedure are correct by applying the above proved theorem disclosed in Scheme C. Some minor modifications of the proof may be applied, as may be evident to a person skilled in the art, in embodiments of the present invention.

Schemes C & D Generally

Embodiments of the present invention may generate variations of digital signatures. Schemes C and D offer options that may permit a user to generate a digital signature that meets that user's specific needs and requirements. The generation of a digital signature may be undertaken in accordance with options that have the result that a user virtually has the choice of a collection or cloud of digital signature possibilities. In this manner the present invention may provide a flexible digital signature tool to users. It may provide a means of ensuring that the digital signature requirements or needs of a user are met each time a user acts to generate a digital signature. Some of the options provided by Schemes C and D are described in more detail below.

In embodiments of the present invention that relate to Schemes C & D, it may be possible that expressions (11") and/or (11*) be written in a form such as the following:

$$\text{int}(K)\text{int}(m)g^d+f=(\text{int}(m)\text{int}(g)+z)q+r. \quad (i)$$

In such an embodiment of the present invention the signature may be presented as a pair (x,y), where $$x=g^d$$

and $$y=\text{int}(m)q+\text{int}(g)^{-1}zq+\text{int}(g)^{-1}r) \bmod p.$$

In such an embodiment of the present invention the verification scheme may be $$T_1^{(int(m)int(x))}x^{T_2}=(((T_1)^{-1})^{T_2})^y.$$

In such an embodiment of the present invention any expression F involving $\text{int}(m)$, z, intK, $\text{intK}^{-1}$, $\text{int}(g)$, $\text{int}(g)^{-1}$ may be used in the right side of equation (i). For example, the following expression may be utilized: $F(\text{int}(m), z, \text{intK}, \text{intK}^{-1}, \text{int}(g), \text{int}(g)^{-1})$. By utilizing the division scheme presented in Schemes C & D it may be possible to obtain q and r, such that $$\text{int}(K)\text{int}(m)g^d+f=F(\text{int}(m),z,\text{intK},\text{intK}^{-1},\text{int}(g),\text{int}(g)^{-1})q+r)$$

for $$0 \le r < F(\text{int}(m),z,\text{intK},\text{intK}^{-1},\text{int}(g),\text{int}(g)^{-1}).$$

In such an embodiment of the present invention a signature may be a pair (x,y) and x may be equal to $$x=g^d$$

and y may be equal to $$y=F'(\text{int}(m),z,\text{intK},\text{intK}^{-1},\text{int}(g),\text{int}(g)^{-1},q,r)$$

such that $$\text{int}(g)^{-1}F'(\text{int}(m),z,\text{intK},\text{intK}^{-1},\text{int}(g),\text{int}(g)^{-1},q,r)= F(\text{int}(m),z,\text{intK},\text{intK}^{-1},\text{int}(g),\text{int}(g)^{-1})q+r; \quad (ii)$$

or such that $$\text{int}(g)F'(\text{int}(m),z,\text{intK},\text{intK}^{-1},\text{int}(g),\text{int}(g)^{-1},q,r)=F(\text{int}(m),z,\text{intK},\text{intK}^{-1},\text{int}(g),\text{int}(g)^{-1})q+r. \quad (iii)$$

In an embodiment of the present invention that utilizes (ii) the verification procedure may be $$T_1^{(int(m)int(x))}x^{T_2}=((T_1)^{T_2-1})^y.$$

In an embodiment of the present invention that utilizes (iii) the verification procedure may be $$T_1^{(int(m)int(x))}x^{T_2}=(((T_1)^{-1})^{T_2})^y.$$

In another embodiment of the present invention an alternate option may be utilized on the left side of (i), such as, for example the following:

$$d=z^*\text{int}(g) \bmod p$$

and $$f=z^*\text{int}(K)^{-1} \bmod p,$$

In such an embodiment of the present invention the left expression of the verification procedure may be $$T_1^{(int(m)int(x))}x^{T_2-1}$$

for $$x=g^d.$$

In one embodiment of the present invention the following expression may be utilized $$\text{int}(K)\text{int}(m)x \quad (iv)$$

and expression (iv) may be generalized. It may be any expression H that in a form of produce may involve $$(\text{int}(K),\text{int}(m),x).$$

In such an embodiment of the present invention the first term on the left side of the verification procedure may be presented as $$T_1^{(int(K)H'(int(m),int(x)))}$$

such that $$\text{int}(K)H'(\text{int}(m),\text{int}(x))=H(\text{int}(K),\text{int}(m),x).$$

A skilled reader will recognize that expressions d and f may be defined in a variety of ways and potentially by a variety of means. For example, in one embodiment of the present invention d may be defined and formed or constructed as an expression R, that may be derived from and depend upon z, intK, intK$^{-1}$, int(g), int(g)$^{-1}$. As another example, f may be defined and formed or constructed as an expression of S, such that $$(g^{R \bmod p})^L = g^{S \bmod p}$$

In such an embodiment of the present invention, L may be $T_2$ or $T_2^{-1}$.

Embodiments of the present invention represented by Schemes A and B as described above may incorporate a fundamental difference from other known schemes, such as ElGamal or DSA algorithms, namely the fact that in both schemes a generator is kept secret. Keeping a generator g secret may increase the security of the scheme. If a generator is unknown this may increase the difficulty of organizing an attack against the scheme. For example, the key attack or extracting z from $g^z$ may become much more difficult. The potential for other possible attacks upon the scheme may also be reduced.

A skilled reader will recognize that the embodiments of the present invention presented as Schemes A-D are merely examples of some of the possible embodiments of the present invention. Other embodiments are also possible. A skilled reader will further recognize that embodiments of the present invention may result in variations of digital signatures that are not discussed in detail herein. Although, examples of a user choosing options to generate digital signature variations that provide increased security and/or increased processing speed, a skilled reader will recognize that embodiments of the present invention may provide options to a user to generate a digital signature to meet other user requirements or needs.

Additionally, embodiments of the present invention represented by Schemes C and D may be fundamentally different from other known schemes (such as ElGamal or DSA schemes), in that these schemes incorporate a generator g and a key K that may be kept secret. The result may be that it may be impossible to extract the generator g and the key K from $T_1$ and $T_2$ by solving the discrete logarithm problem in G. To obtain g and K from the public keys $T_1$ and $T_2$ it may be necessary has to solve the system of equations $$g^{int(K)} = T_1,$$

$$(int(K)*int(g)) \bmod p = T_2,$$

which may not be equivalent to the discrete logarithm problem.

Embodiments of the invention may be represented as a software product stored in a machine readable medium (also referred to as a computer-readable medium, a processor-readable medium, or a computer usable medium having a computer readable program code embodied therein). The machine readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

The computer program of the present invention is therefore best understood as a computer program that includes computer instructions operable to implement an operation consisting of the digital signatures scheme as described above or other embodiments thereof.

Another aspect of the present invention is a computer system that is linked to a computer program that is operable to implement on the computer system the digital signatures schemes, in accordance with the present invention.

This invention will be of use in any environment wherein digital signatures schemes may be used for data integrity or authentication. An example is secure email.

As another example, the method of the present invention can be readily implemented in a specially constructed hardware device. Such a hardware implementation of the present invention may enable a dramatic increase in the speed of hashing, as all the hardware implementations of stream schemes are usually much faster than the corresponding software implementations. In particular, one embodiment may apply one-chip hardware configuration.

The aspects of the present invention and embodiments thereof presented lend the invention to several applications. For example, the present invention may be applied to an online environment wherein digital signatures are routinely applied, for the purpose of ensuring the security of data passed between users. This use has practical applicability in several markets regarding the flow of electronic information, such as banking, legal, other professional businesses and trades, as well as within the public sector in government, universities, hospitals and other institutions. In these environments information is passed regularly between members by way of the Internet, Intranets and internal networks. Furthermore, online implementations of the present invention can utilize existing signal processing providers, such as telecommunications companies like as Bell Canada™ or Rogers™, as well as private networks, to facilitate transmissions.

The above-described embodiments of the present invention are intended to be examples only. It will be appreciated by those skilled in the art that other variations of the embodiments described herein may also be practiced without departing from the scope of the invention. Other modifications are therefore possible.

What is claimed is:

1. A system directed at a digital signatures system configured to avert attacks upon messages, comprising:
    a. at least one computer;
    b. a message sent by a sender by way of the at least one computer;
    c. the digital signatures system being configured to operate by the at least one computer for application to the message, said digital signatures system being configured to keep a generator utilized by the digital signatures system secret;
    wherein attacks upon the security of the message are averted through the application of the digital signatures system,
    wherein the digital signatures system comprises a signing procedure and verification procedure that utilize at least the following:
        a. the generator;
        b. a private key;
        c. one or more public keys; and
        d. a sessional number, and
    wherein the digital signatures system generates two public keys.

2. The system of claim 1, wherein at least one of the private key and the sessional number are kept secret.

3. The system of claim 1, wherein an implementation of the digital signature system is selected from the group consisting of firmware, hardware, and software.

4. A method of application of a digital signatures system to a message sent by a user from a computer, comprising the following steps:
   a. applying a signing procedure that identifies a generator and keeps the generator secret, said signing procedure appending a digital signature to the message;
   b. applying a verification procedure to the message with the digital signature appended thereto, said verification procedure further protecting the generator as secret; and
   c. averting an attack upon the security of the message,
   wherein a computer chip is configured to execute each step of the method of application,
   wherein the signing procedure applying the further steps:
      a. determining a group and identifying the generator from the group;
      b. generating one or more public keys;
      c. generating a private key;
      d. generating a sessional number; and
      e. generating the digital signature and appending said digital signature to the message, and
   wherein comprising the further step of generating two public keys.

5. The method of claim 4, comprising the further step of keeping one or more of the following secret: the private key; or the sessional number.

6. The method of claim 4, comprising the further steps of:
   a. setting two conditions relating to keeping the generator secret; and
   b. generating the two public keys in relation to the two conditions;
   whereby the two public keys cause the digital signatures system to be more secure from attack.

7. The method of claim 4, comprising the verification procedure being applied to the message with the digital signature appended thereto in accordance with the following steps:
   a. obtaining information about one or more public keys relating to the digital signature;
   b. obtaining information about a group relating to the digital signature; and
   c. utilizing the public key and the group to verify the message.

8. The method of claim 7, comprising the further step of the verification procedure keeping one or more of the following secret: the private key; or the sessional number.

9. The method of claim 4, comprising the further step of the digital signatures system generating elements including the generator, a private key and a sessional number and keeping the generator, the private key and the sessional number secret, and thereby limiting the elements that are knowable by an attacker to diminish the likelihood of a successful attack upon the message by the attacker.

10. The method of claim 4, comprising the further steps of:
   a. linking one or more computer processors to the computer; and
   b. processing the signing procedure and verification procedure.

11. The method of claim 4, comprising the further step of a choosing the generator from a cyclic group.

12. The method of claim 4, the comprising the following steps:
   a. applying the signing procedure comprising the further steps of:
      i. choosing the generator from a group;
      ii. a user choosing a private key;
      iii. generating one or more public keys utilizing the generator and the private key;
      iv. storing the one or more public keys and information about the group to a public directory;
      v. generating one or more values of the message;
      vi. generating a sessional number that is random through the use of a division system; and
      vii. generating the digital signature of the message and appending the digital signature to the message; and
   b. applying the signing procedure comprising the further steps of:
      i. receiving the message with the digital signature appended thereto;
      ii. obtaining the one or more public keys and the group;
      iii. utilizing the one or more public keys and the group to verify the values of the message; and
      iv. generating a verification result for the message.

13. The method of claim 12, comprising the step of generating the one or more values of the message as a hash value or a MAC value.

14. The method of claim 12, comprising the step of generating the digital signature in accordance with one or more options whereby the digital signature is generated from a collection of possible digital signatures.

* * * * *